US008947459B2

(12) United States Patent
Osuga et al.

(10) Patent No.: US 8,947,459 B2
(45) Date of Patent: Feb. 3, 2015

(54) CONTENTS PLAYBACK APPARATUS, CONTENTS PLAYBACK METHOD, AND COMPUTER PROGRAM

(75) Inventors: Toru Osuga, Tokyo (JP); Takashi Oshiba, Tokyo (JP); Katsuhiro Ochiai, Tokyo (JP); Yoshiaki Nishikawa, Tokyo (JP); Kozo Satoda, Tokyo (JP); Kazuaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 121 days.

(21) Appl. No.: 13/426,023

(22) Filed: Mar. 21, 2012

(65) Prior Publication Data

US 2012/0242700 A1 Sep. 27, 2012

(30) Foreign Application Priority Data

Mar. 24, 2011 (JP) ................................ 2011-066203

(51) Int. Cl.
*G09G 5/00* (2006.01)
*G06F 3/147* (2006.01)

(52) U.S. Cl.
CPC ...... *G09G 5/00* (2013.01); *G06F 3/147* (2013.01); *G09G 2340/045* (2013.01); *G09G 2340/145* (2013.01); *G09G 2354/00* (2013.01)
USPC ........... 345/637; 345/634; 345/629; 345/641; 345/671

(58) Field of Classification Search
None
See application file for complete search history.

(56) References Cited

U.S. PATENT DOCUMENTS

| 6,405,129 B1* | 6/2002 | Yokota .......................... 701/438 |
| 2005/0197763 A1* | 9/2005 | Robbins et al. ............... 701/200 |
| 2010/0079490 A1* | 4/2010 | Terazono et al. ............. 345/629 |
| 2010/0085380 A1* | 4/2010 | Tsuda ........................... 345/629 |
| 2010/0195979 A1* | 8/2010 | Iwasaki et al. ................. 386/95 |
| 2011/0115818 A1* | 5/2011 | Chung et al. .................. 345/635 |

FOREIGN PATENT DOCUMENTS

| JP | 7-271505 A | 10/1995 |
| JP | 2002023911 A | 1/2002 |
| JP | 2005-12307 A | 1/2005 |
| JP | 2005-236462 A | 9/2005 |

(Continued)

OTHER PUBLICATIONS

Communication dated Nov. 11, 2014 from the Japanese Patent Office, in counterpart Application No. 2011-066203.

*Primary Examiner* — Joni Richer
*Assistant Examiner* — Yi Wang
(74) *Attorney, Agent, or Firm* — Sughrue Mion, PLLC

(57) ABSTRACT

A contents playback apparatus and the like are provided which allow a user to promptly designate a desired portion when displaying a part of a content in an expanded manner, and are thus excellent in operability. A contents playback apparatus includes an associating unit and a playback unit. The associating unit generates association information for a plurality of characteristic portions contained in a content by referring to priority orders of the respective characteristic portions relative to each other, the association information associating each of the characteristic portions individually with a predetermined operation key of an input device included in the apparatus in accordance with the priority orders. The playback unit plays back, in response to detecting an operation of an operation key during display of the content, the characteristic portion corresponding to the operation key in an expanded display mode, in accordance with the association information.

18 Claims, 14 Drawing Sheets

(56) References Cited

FOREIGN PATENT DOCUMENTS

| JP | 2005265842 A | 9/2005 |
| JP | 2005311888 A | 11/2005 |
| JP | 2007074458 A | 3/2007 |
| JP | 2008-40703 A | 2/2008 |
| JP | 2008-160427 A | 7/2008 |
| JP | 2010-114639 A | 5/2010 |
| JP | 2010-117680 A | 5/2010 |
| JP | 2010226384 A | 10/2010 |

* cited by examiner

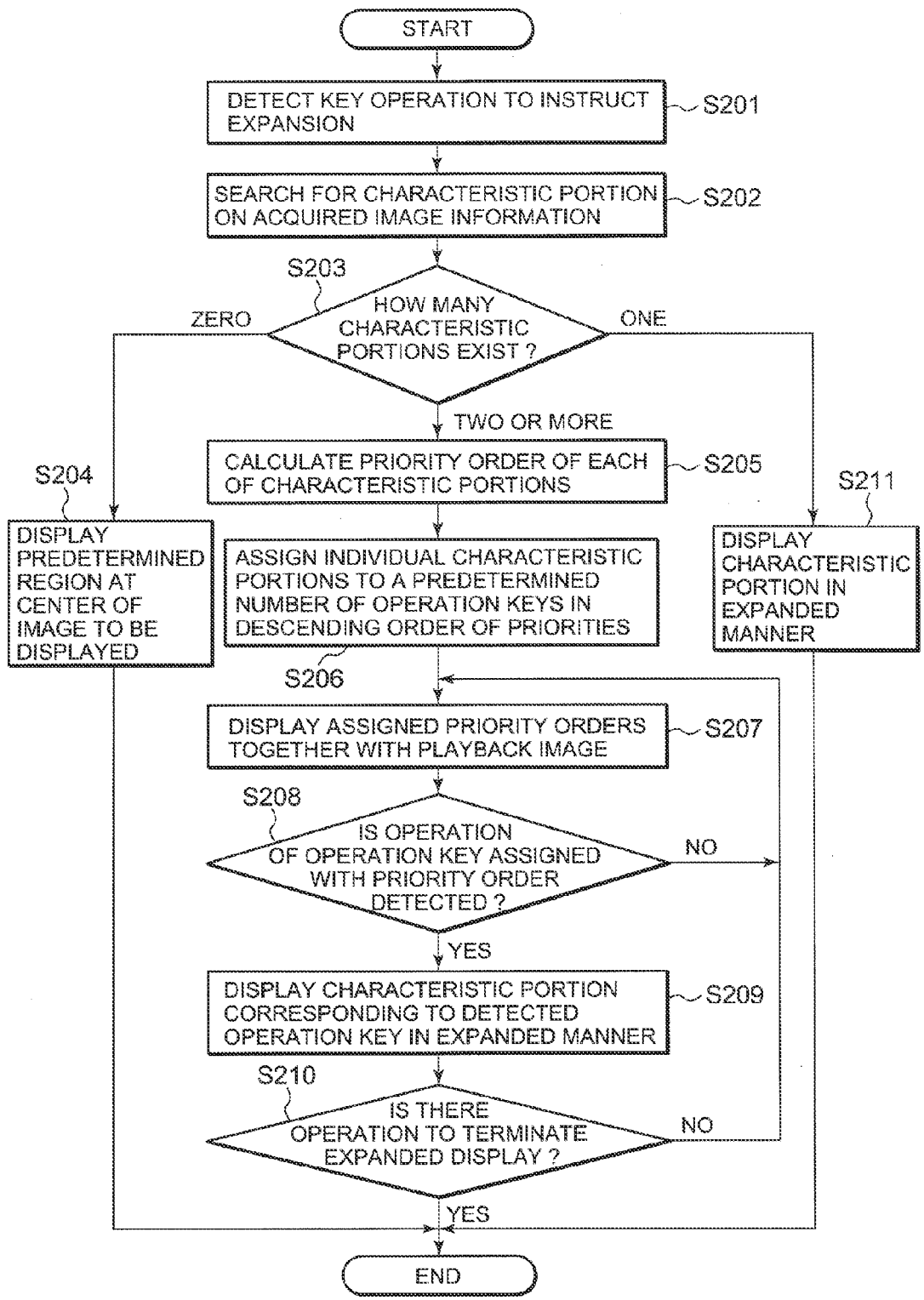

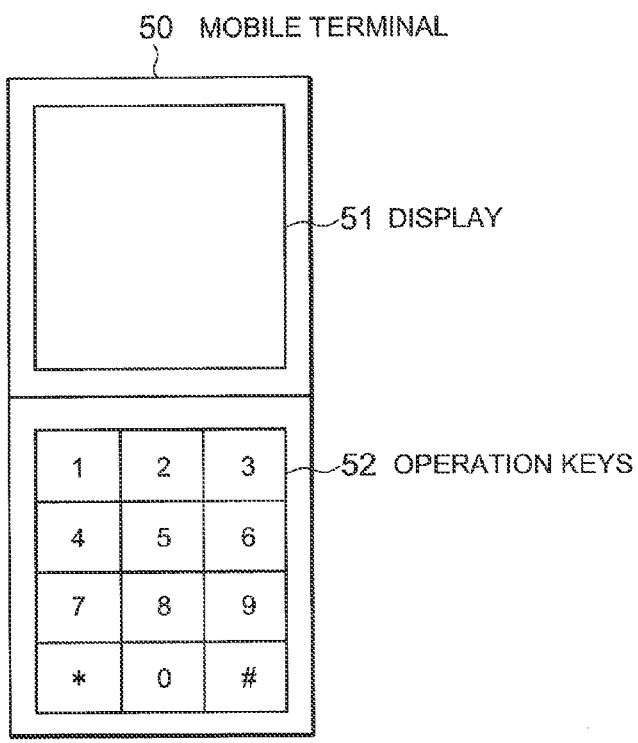

CONTENTS PLAYBACK APPARATUS, CONTENTS PLAYBACK METHOD, AND COMPUTER PROGRAM

This application claims priority from Japanese patent application No. 2011-066203, filed on Mar. 24, 2011, the disclose of which is incorporated herein in its entirety by reference.

BACKGROUND

1. Field

The present invention relates to a technology for playing back a content in a content sharing service, or the like, for sharing a content such as a picture (static image) or a moving image among an own terminal and another terminal.

2. Description of the Related Art

Along with the recent development of communication network technologies, various services have been widely available that enable bidirectional communications with another person in a distant place. Among such various services, a so-called content sharing service allows an own terminal used by a user and another terminal used by another user in a distant place to communicate with each other while sharing various contents such as a static image (photograph), a moving image, a text material, and the like in real-time. As an example of such technology, Japanese. Unexamined Patent Publication No. 2010-114639 (hereinafter "Patent Document 1") discloses a technology for sharing and synchronizing content information among a plurality of users. In addition, Japanese Unexamined Patent Publication No. 2005-236462 (hereinafter "Patent Document 2") discloses a technology for storing a display control operation history of video contents, and for allowing a plurality of users to communicate with one another in real-time by using the display control operation history. Moreover, Japanese Unexamined Patent Publication No. 2008-040703 (hereinafter "Patent Document 3") discloses a technology for displaying an expanded image of a predetermined region in each of terminals in accordance with an instruction operation of a user.

In a case where communications are performed between a plurality of terminals (information processing apparatuses), the controls of an image to be displayed on each of the terminals for sharing information, and among such controls, for example, the displaying of a characteristic portion within an image of interest in the communications requires various approaches.

Meanwhile, there are Patent Documents described below as related technologies existing prior to the present application.

Specifically, Japanese Unexamined Patent Publication No. 1995-271505 (hereinafter "Patent Document 4") discloses a display control apparatus capable of expanding and reducing a display screen in accordance of the pressing of an expanding button in a manual mode.

Japanese Unexamined Patent Publication No. 2008-160427 (hereinafter "Patent Document 5") discloses content information containing a plurality of characteristic points (characteristic regions) and a technology for displaying a partial image in an expanded manner on the basis of these characteristic points.

Japanese Unexamined Patent Publication No. 2005-012307 (hereinafter "Patent Document 6") discloses an imaging apparatus capable of recording, together with a captured image, coordinates of a position of an object which are calculated at the time of the capture.

Japanese Unexamined Patent Publication No. 2010-117680 (hereinafter "Patent Document 7") discloses a technology for recording, in a captured image, a focus detecting point and focus detection data at the instance when the image is captured, and for enabling a user to, utilize the data.

In a case where a user uses a mobile terminal such as a mobile phone when utilizing a content sharing service, a user interface (man-machine interface) is limited. For this reason, an operability of operation of designating (instructing) a partial region for expansion out of a content such as an image of interest is concerned. In particular, this problem is significant in terms of a mobile terminal using physical operation keys provided on the terminal, unlike a so-called smart phone capable of recognizing touch and gesture performed by a user on a screen. Specifically, only an operation of an operation key to instruct expansion often causes a portion that is not intended by the user to be displayed in an expanded manner. In addition, for example in patent Document 4, when a user desires an expanded display, the user designates a desired portion by combining operations of predetermined operation keys for designating up, down, right, and left for designating the desired portion. However, designating the desired portion through the user interface described in Patent Document 4 requires for the user to repeat key operations while looking at a small display screen, and thus is troublesome. Furthermore, in the case of such user interface, an expanded image is often out of the range of the desired portion. For these reasons, the user gets confused in determining a positional relationship between the expanded image and the portion which the user desires to display in the expanded manner.

As described above, when a mobile terminal using physical operation keys provided on the terminal is utilized for the contents sharing service, its operability and convenience are problematic. In particular, in a case where a content such as a photograph is to be shared during communications, the user of the mobile terminal having the above-described user interface needs to stop the conversation for a long time, so that comfortable communications with the partner are disturbed.

In this regard, certain embodiments of the invention can provide a contents playback apparatus which allows a user to promptly designate a desired portion when displaying a part of a content in an expanded manner, and is thus excellent in operability.

SUMMARY

A contents playback apparatus according to certain embodiments of the invention can be characterized by including the following configuration.

According to certain embodiments, a contents playback apparatus can be characterized in that the contents playback apparatus includes: associating unit for generating association information for a plurality of characteristic portions contained in a content by referring to priority orders of the respective characteristic portions relative to each other, the association information associating each of the characteristic portions individually with a predetermined operation key of an input device included in the apparatus in accordance with the priority orders; and playback unit for playing back, in response to an operation key detected during display of the content, the characteristic portion corresponding to the operation key in an expanded display mode, in accordance with the association information.

In addition, the contents playback apparatus can be characterized in that, for example, the playback unit displays, in a currently displayed content, the priority orders in such a manner as to superimpose the priority orders on the characteristic portions in such a display mode that each of the priority orders is recognizable.

Moreover, another embodiment of the invention can be characterized in that, the playback unit displays the priority orders, together with a currently displayed content or on a different screen from the currently displayed content, in such a display mode that a correspondence between the priority orders and the characteristic portions is recognizable.

Note that the same performance is also achieved by a contents playback method corresponding to the contents playback apparatus having each of the above-described configurations.

Furthermore, the same performance is also achieved by a computer program or a computer-readable storage medium having the computer program stored therein, the computer program for implementing, with a computer, the contents playback apparatus having each of the above-described configurations and corresponding methods.

Effect of the Invention

The above-described inventions make it possible to provide a contents playback apparatus which allows a user to promptly designate a desired portion when displaying a part of a content in an expanded manner, and are thus excellent in operability.

BRIEF DESCRIPTION OF THE DRAWINGS

The above and/or other aspects will become apparent and more readily appreciated from the following description of embodiments, taken in conjunction with the accompanying drawings, in which:

FIG. 6 is a flowchart showing contents playback processing executed by the mobile terminal 50 according to another embodiment.

FIG. 7 is a diagram schematically illustrating an outer shape of a mobile station that is employable in another embodiment.

FIG. 8 is a diagram conceptually illustrating an association information 14 generated by a priority-order determining unit 18 of the mobile terminal 50 in another embodiment.

DETAILED DESCRIPTION

Next, modes for carrying out the present invention will be described in detail with reference to the drawings.

First Embodiment

Figure 1:
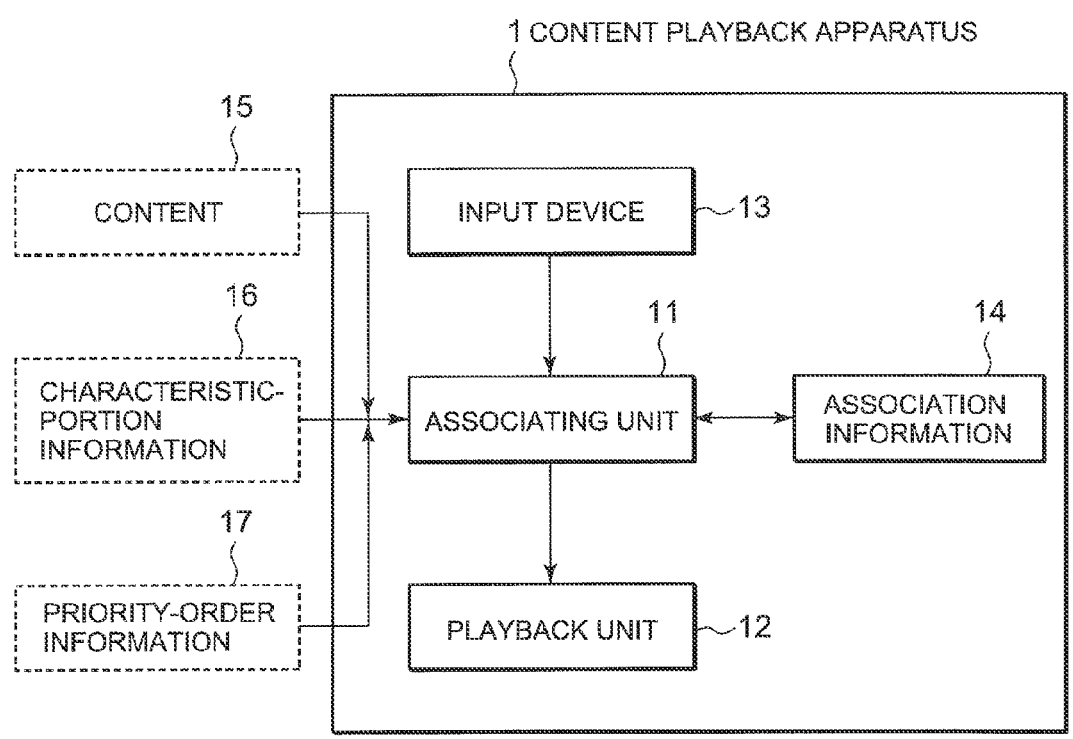
FIG. 1 is a block configuration diagram of a contents playback apparatus according to a first embodiment.

FIG. 1 is a block configuration diagram of a contents playback apparatus according to a first embodiment of the present invention. A contents playback apparatus 1 includes an associating unit 11, a playback unit 12, and an input device 13.

The input device 13 includes operation keys, such as numeric keys, for example.

The associating unit 11 refers to a content 15, a feature or characteristic-portion information 16, and priority-order information 17, thereby associating (assigning) individual characteristic portions with certain operation keys of the input device 13 included in the own apparatus, in accordance with the priority-order information 17. In this way, the associating unit 11 generates association information 14.

Here, the characteristic-portion information 16 is information on a plurality of features or characteristic portions contained in the content 15. In this embodiment, the characteristic portions are characteristic points or characteristic regions in a content of interest (the same applies to the following embodiments). In addition, the content is, for example, a static image such as a photograph, a moving image, a text, a web page content, or a presentation material containing a graph, an illustration, and the like (the same applies to the following embodiments).

The priority-order information 17 is information indicating the priority orders of the characteristic portions indicated by the characteristic-portion information 16 relative to one another.

The playback unit 12 plays back, in response to an operation key detected during display of the content 15, a characteristic portion corresponding to the operation key in the expanded display mode, in accordance with the association information 14.

Figure 2:
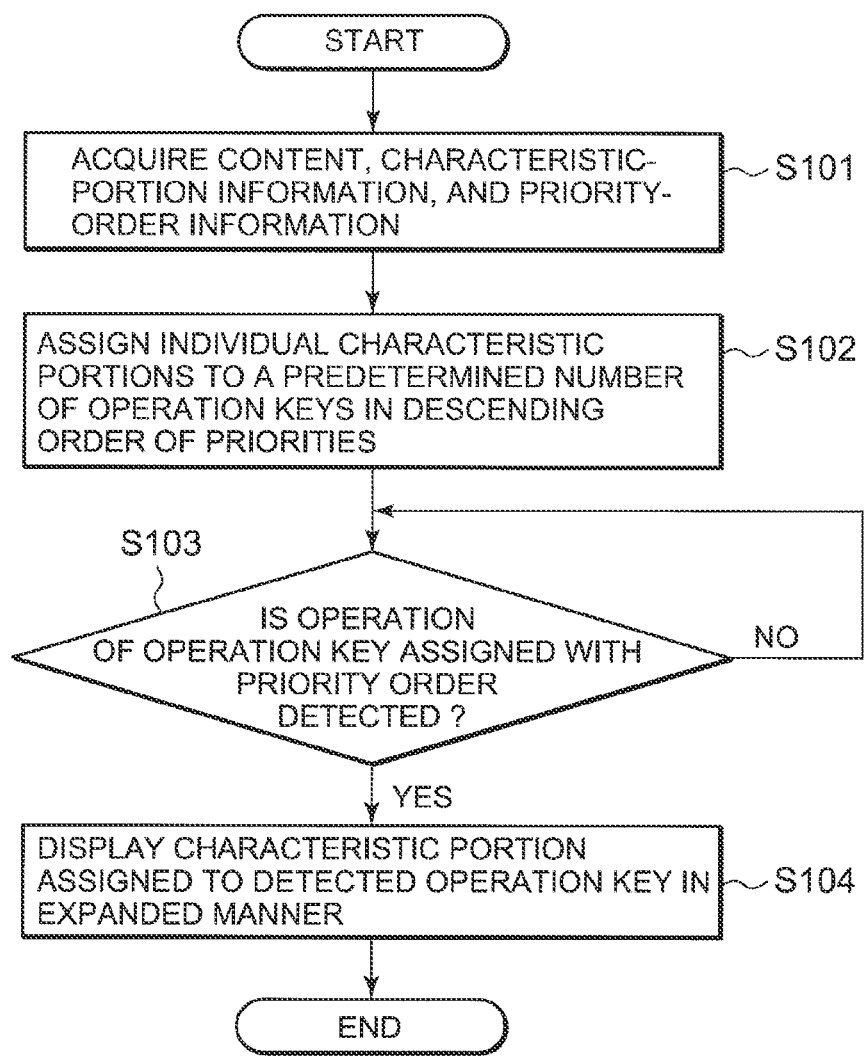
FIG. 2 is a flowchart showing playback processing performed by the contents playback apparatus according to the first embodiment.

FIG. 2 is a flowchart showing playback processing performed by the contents playback apparatus according to the first embodiment of the present invention. This flowchart shows processing procedures of the case where the associating unit 11 and playback unit 12 described above are implemented by a software program executed by a CPU (Central Processing Unit), which is not illustrated in FIG. 1.

The contents playback apparatus 1 acquires the content 15 such as image information, the characteristic-portion information 16, and the priority-order information 17 from an external apparatus (not illustrated in FIG. 1) (Step S101).

The contents playback apparatus 1 associates individual characteristic portions represented by the characteristic-portion information 16 with a predetermined number of operation keys in the descending order of priority orders, in accordance with the priority-order information 17 acquired in Step S101. In this way, the contents playback apparatus 1 generates the association information 14 (Step S102).

When detecting an operation of any of the operation keys assigned with the priority orders in Step S102 (YES in Step S103), the contents playback apparatus 1 refers to the association information 14, and thus plays back the characteristic portion assigned to the detected operation key in the content 15 in the expanded display mode (Step S104).

Such contents playback apparatus 1 according to this embodiment enables the user to promptly designate a desired portion when displaying a part of a content in an expanded manner, and is thus capable of achieving an excellent operability.

Specifically, in the contents playback apparatus 1, the associating unit 11 associates individual characteristic portions with the operation keys of the own apparatus even in a case where the own apparatus is different from an apparatus that allows direct operation to be conducted through touch and gesture on a screen by the user, and thus, main operation is conducted by using the physical operation keys. For this reason, the contents playback apparatus 1 is capable of promptly and accurately playing back a characteristic portion desired by the user in an expanded display conducted by the playback unit 12.

Second Embodiment

Next, a second embodiment based on the contents playback apparatus 1 according to the above-described first embodiment will be described. In the following description, distinguishing portions according to this embodiment will be mainly described. At this time, the same configurations as those of the above-described first embodiment will be denoted by the same reference numerals, and redundant description will be omitted.

In this embodiment, a case will be described where the contents playback apparatus 1 described in the first embodiment is employed in a mobile terminal (mobile phone). First, a hardware configuration of a mobile terminal 50 according to this embodiment will be described.

Figure 3:
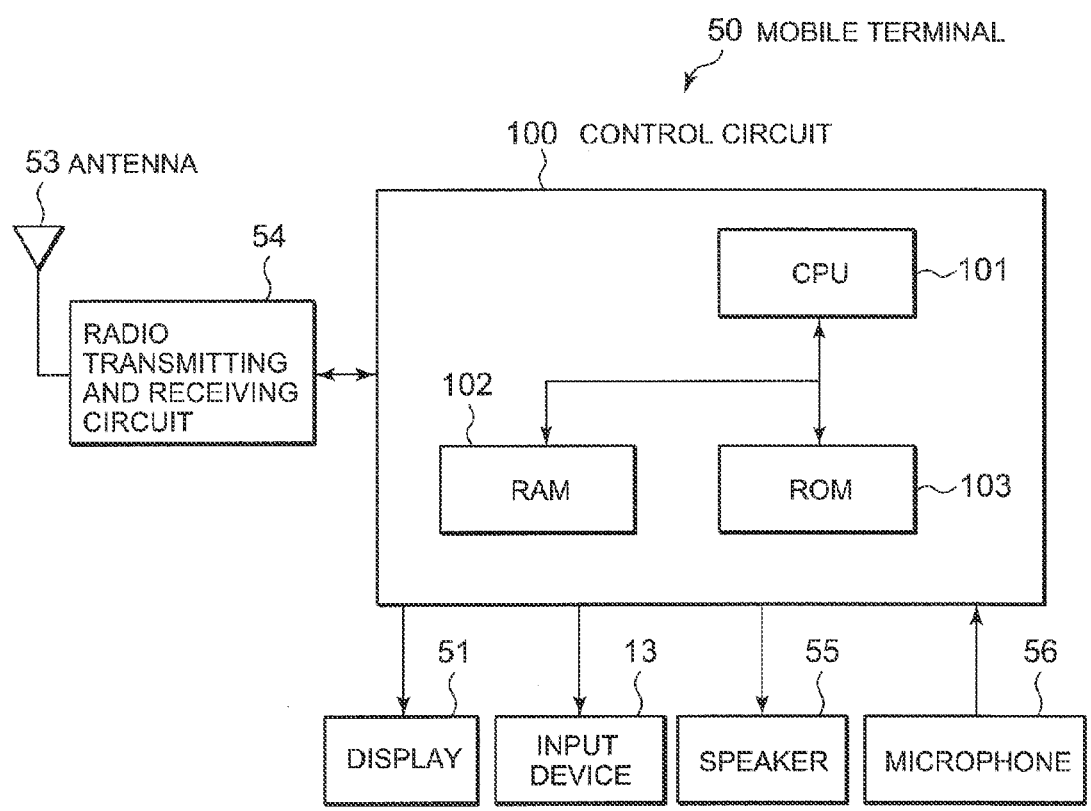
FIG. 3 is a block diagram illustrating a hardware configuration of a mobile terminal that is employable in another embodiment.

FIG. 3 is a block diagram illustrating the hardware configuration of a mobile terminal that is employable in the second embodiment of the present invention. FIG. 7 is a diagram schematically illustrating an outer shape of a mobile terminal that is employable in the second embodiment of the present invention.

The mobile terminal 50 includes a display 51, an input device (including operation keys 52) 52, an antenna 53, a radio transmitting and receiving circuit 54, a speaker 55, a microphone 56, and a control circuit 100. Note that, the operation keys 52 are physically existing keys, and the form of the keys includes various forms, such as a set of a plurality of physically existing keys, a resin sheet having a plurality of areas defined with printed letters and figures, a software button displayed on a sub-display having a touch operation function, and the like.

The control circuit 100 includes a CPU 101, a RAM (Random Access Memory) 102, and a ROM (Read Only Memory) 103. In the hardware configuration, the CPU 11 manages the entire operation of the mobile terminal 50 by executing various software programs while using the RAM 102 as a temporary storage area. Then, the mobile terminal 50 performs voice communications and data communications, as general radio transmission and reception processing, by controlling these hardware units. The detailed description of the operation itself of the hardware for such voice communications and data communications will be omitted in this embodiment because any approaches that are common now can be employed for the operation.

Figure 4:
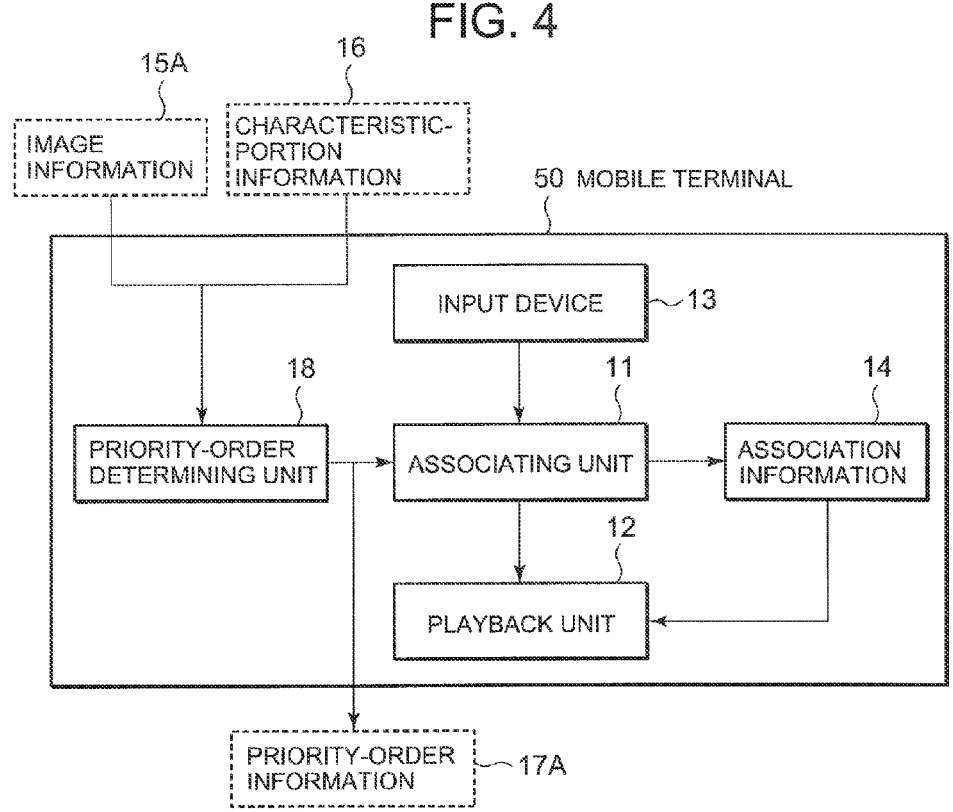
FIG. 4 is a block diagram illustrating a functional configuration, for playing back images, of the mobile terminal according to another embodiment.

Further, the mobile terminal 50 performs processing particular to this embodiment, which will be described below. FIG. 4 is a block diagram illustrating a functional configuration, for playing back images, of the mobile terminal according to the second embodiment. The mobile terminal 50 further includes a priority-order determining unit 18 in addition to the configurations described in the above-described first embodiment. The priority-order determining unit 18 acquires from, an external apparatus, image information 15A, which is an example of the content 15, and characteristic-portion information 16, which represents characteristic portions contained in the image information. Note that the image information 15A and the characteristic-portion information 16 may be a single data set or separate data sets as long as a correspondence between these two types of information can be recognized from an identifier or the like.

The priority-order determining unit 18 generates priority-order information (equivalent to the priority-order information 17 in the first embodiment) on the basis of the image information 15A and the characteristic-portion information 16 thus acquired. Here, the external apparatus is a mobile terminal of a communication partner, a contents server managed by a service provider, or the like, for example.

Figure 5:
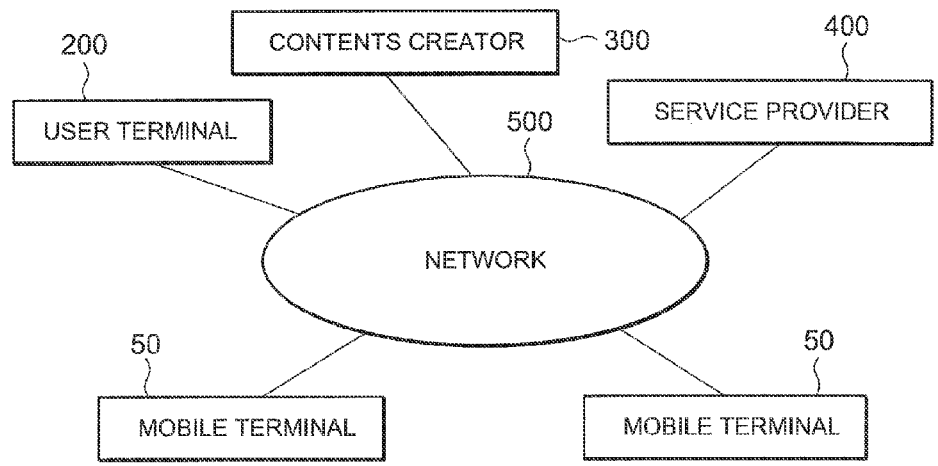
FIG. 5 is a diagram illustrating a system configuration that is employable in a case where the mobile terminal 50 according to another embodiment is applied to a contents sharing service.

FIG. 5 is, a diagram illustrating a system configuration that is employable in a case where the mobile terminal 50 according to the second embodiment is applied to a contents sharing service. The mobile terminal 50 is capable of communicating as necessary with another mobile terminal (50) having an apparatus configuration that is different from but similar to that of the own mobile terminal, a user terminal 200, a contents creator 300, and a service provider 400 through a general communication network (500) such as a wired or wireless communication networks or the Internet.

The user terminal 200 is, for example, a personal computer, a mobile information processing apparatus, or a so-called smart phone capable of recognizing touch and gesture, or the like. The contents creator 300 is, for example, an information processing apparatus, such as a server, used by a company that creates various contents such as image information used for the contents sharing service. The service provider 400 is, for example, an information processing apparatus, such as a server, managed by a company that provides the contents sharing service and the like to the mobile terminal 50 and the like. The service provider 400 acquires contents to be provided from the contents creator 300, for example.

Next, the operation executed by the mobile terminal 50 to perform expanded display in this embodiment will be described with reference to FIG. 6 and following.

FIG. 6 is a flowchart showing contents playback processing executed by the mobile terminal 50 according to the second embodiment of the present invention. The mobile terminal 50 starts this contents playback processing in response to detection of a predetermined key operation to instruct expansion (Step S201). In this embodiment, the predetermined key operation is an operation of a key other than the numeric keys (0 to 9), for example, the * (asterisk) key or the # (sharp) key, or any combination of a plurality of these keys.

The priority-order determining unit 18 searches for the characteristic-portion information 16 on the image information 15A acquired from the external apparatus (Step S202). Here, the characteristic-portion information 16 may be various types of information as long as the information is recognizable by the priority-order determining unit 18. Examples of such information include: a result of recognition of an image of a face or an image of a person; a focused position (focused point); information representing a region designated at the event of image editing; a region corresponding to information written by a user of an external apparatus at the event of contents sharing; an area having a size larger than a certain size; and the like.

Note that the characteristic-portion information 16 may not be information acquired from an external apparatus, but may be a region corresponding to information written by a user of an external apparatus at the event of contents sharing, or information acquired by the priority-order determining unit 18 per se through general image processing on the basis of the image information 15A.

The priority-order determining unit 18 determines, as a result of the search in Step S203, how many characteristic portions exist in an image of current interest (image information 15A) (Step S203). If a result of the determination in Step S203 is 0 or 1, the priority-order determining unit 18 gives the result of the processing to the playback unit 12. If the result of the determination in Step S203 is 2 or more, the priority-order determining unit 18 proceeds the processing to Step S205.

If the number of characteristic portions acquired from the priority-order determining unit 18 is 0, the playback unit 12 displays (plays back) a predetermined region at the center of the image on the display 51 in the expanded display mode, out of the entire image of interest (Step S204). The playback unit 12 then terminates the display mode in response to the elapse of a predetermined period of time, for example.

Otherwise, if the number of characteristic portions acquired from the priority-order determining unit 18 is 1, the playback unit 12 displays (plays back) the one characteristic portion on the display 51 in the expanded display mode (Step S211). The playback unit 12 then terminates the display mode in response to the elapse of a predetermined period of time, for example.

If detecting two or more characteristic portions from the image of interest in Step S203, the priority-order determining unit 18 calculates the priority order of each of the respective characteristic portions (Step S205). In this way, the priority-order determining unit 18 generates the priority-order information 17A. Moreover, if the mobile terminal 50 utilizes the contents sharing service, it is favorable that, in this step, the priority-order determining unit 18 transmits the priority-order information 17A thus generated to an external apparatus via the radio transmitting and receiving circuit 54. This is because the external apparatus and the own terminal are enabled to share the same priority orders for the same image.

Here, a method of calculating a priority order (priority) will be described. In this embodiment, the priority-order determining unit 18 finds a priority P in accordance with the following equation (1):

$$\text{Priority } P = gC \times \{C \times S - fC(t)\} + gR \times \{R \times S - fR(t)\} + gE \times \{E \times S - fE(t)\} + gF \times \{F \times S - fF(t)\} \quad (1).$$

In the above-described equation (1), each parameter is as follows:

C: the result of writing by the contents sharing
R: the result of face recognition or person recognition
E: a portion (region) designated during image processing or image editing
F: a focused position (focused point)

Note that the above-described parameters C, R, E, and F are fixed values set by any of the user, the service provider, and the content creator, and are predetermined fixed value, such as C=100, R=50, E=30, and F=20, for example.

t: the elapsed period of time after a characteristic portion appears

S: a weight determined in accordance with the size of the characteristic Portion, for example, a proportion of the area of a moving image or a static image to the entire area (the larger the characteristic portion is, the larger the value of S is made), or the like. Note that, it is also possible to consider that the smaller the characteristic portion is, the higher the necessity of expanding is, and therefore, the value of S may be increased as the characteristic portion becomes smaller in size. As to which way of thinking is employed, a configuration that can be changeable by unit of the setting of the mobile terminal 50 by the user, or the like, may be employed as appropriate, for example.

fC(t), fR(t), fE(t), fF(t): increasing functions to lower the priority in accordance with the elapse of a period of time. Specifically, the increasing functions may be set in such a manner that if t1≤t2, fC(t1)≤fC(t2). Most simply, a relation in which fC(t)=fR(t)=fE(t)=fF(t) may be employed. On the other hand, if the image information 15A is of a static image, a relation in which fR(t)=fE(t)=fF(t)=0 may be employed.

gC, gR, gE, gF: coefficients representing whether each characteristic portion exists within a display region and whether each characteristic portion meets the above-described respective parameters C, R, E, and F. Here, the display region is an area of an image displayed on the display 51 at a certain timing (for example, when the user performs an expanding operation). For example, the parameter gC, gR, gE, or gF is 1 in a case where a characteristic portion exists within the display region and meets the type, while the parameter gC, gR, gE, or gF is 0 in the other cases.

Note that the above-described various parameters C, R, E, F, and S as well as increasing functions fC(t), fR(t), fE(t), and fF(t) may be configured to be capable of being set by at least any of the mobile terminal 50, the user terminal 200, the contents creator 300, and the service provider 400. For example, it is possible to employ a configuration in which C, R, E, F are set by the user of the mobile terminal 50 and S, fC(t), fR(t), fE(t), and fF(t) are set by the service provider 400 in advance.

Moreover, for the setting of the above-described parameters and increasing functions, at least any one of methods described below may be employed.

direct input of numeric values and equations
a general user interface such as an abstracted pull-down menu or slide bar (tab), like a Low-Middle-High, a five-point scale, or the like Note that the priority orders may be configured such that a characteristic portion for which the priority is intended to be switched among characteristic portions is capable of being switched by a general operation such as dragging. In addition, the number of candidates for characteristic portions to be displayed (played back) in the expanded display mode may be configured to be capable of being set by the user of the mobile terminal 50 (for example, the minimum value is set at 1 and the maximum value is set at 10 in a case where the numeric keys are used).

In addition, in the case of the contents sharing service, a plurality of participants participate in the service by using their mobile terminals 50, user terminals 200, and the like. In such case, the priority-order determining unit 18 may perform negotiations, such as finding an average value, on the basis of the priority orders set by individual users in their devices used.

The priority-order determining unit 18 assigns the individual characteristic portions to a predetermined number of operation keys in the descending order of priorities by referring to the priority orders (priorities P) determined in Step S205. In this way, the priority-order determining unit 18 generates association information 14 (Step S206). The priority-order determining unit 18 stores the association information 14 thus created in a memory such as the RAM 102.

FIG. 8 is a diagram conceptually illustrating the association information 14 generated by the priority-order determining unit 18 of the mobile terminal 50 in the second embodiment of this embodiment. The example illustrated in FIG. 8 shows a state where ten operation keys are assigned (associated) in the order of priorities.

The playback unit 12 displays a playback image based on the image information 15A on the display 51 and also displays the playback image and the priority orders together in a superimposed manner, by referring to the association information 14.

Figure 9:
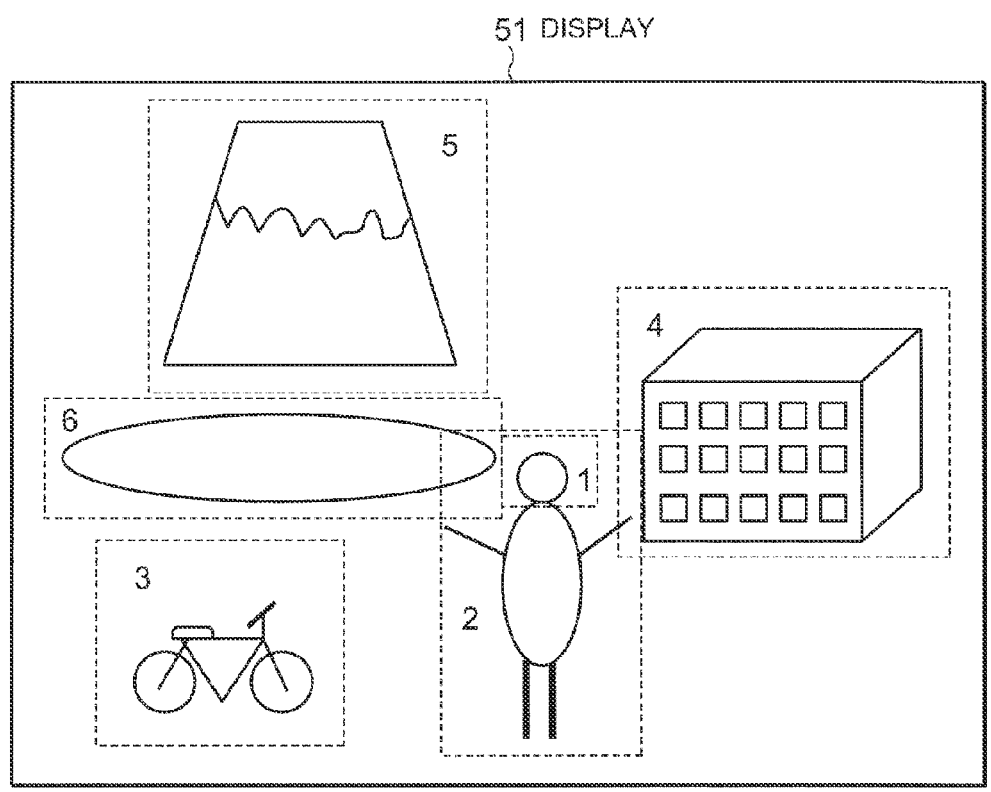
FIG. 9 is a diagram illustrating one display mode which a playback unit 12 of the mobile terminal 50 displays in the execution of the contents playback processing in another embodiment.

FIG. 9 is a diagram illustrating one display mode which the playback unit 12 of the mobile terminal 50 displays in the execution of the contents playback processing in the second embodiment of this embodiment. In the example illustrated in FIG. 9, an entire image played back on the basis of the image information 15A is displayed over the entire display region of the display 51, and characteristic portions contained in the entire image are indicated by dashed line frames. In this embodiment, the entire image played back on the basis of the mage information 15A is a frame image generated by using a digital camera, a camera function of a mobile terminal, or the like. Moreover, in the example illustrated in FIG. 9, a corresponding priority order is displayed as a numeric value on each of the characteristic portions in a superimposed manner. In the illustrated example, six characteristic portions are contained in the entire image. For this reason, in the illustrated example, numbers from one to seven six are given to the respective characteristic portions in accordance with the priority orders.

Note that the example illustrated in FIG. 9 shows a display mode of displaying only one common numeric value, in the case where the numeric value of the priority order is equal to the number of the numeric key, in accordance with the association information 14 illustrated in FIG. 8, for the sake of convenience in description and illustration.

Figure 10:
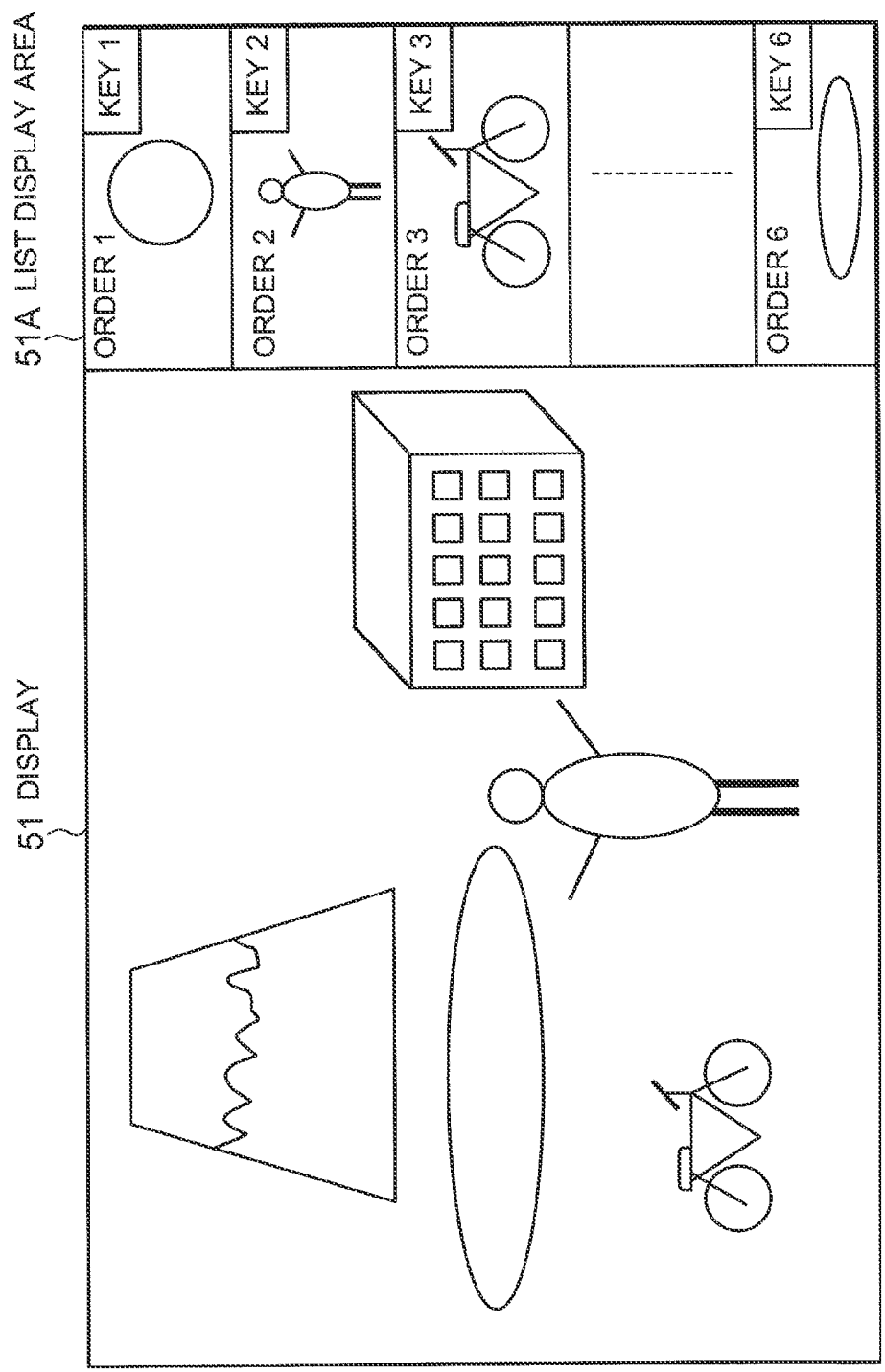
FIG. 10 is a diagram for describing another display mode which the playback unit 12 of the mobile terminal 50 displays in the execution of the contents playback processing in another embodiment.

FIG. 10 is a diagram for describing another display mode which the playback unit 12 of the mobile terminal 50 displays in the execution of the contents playback processing in the second embodiment of this embodiment. In the example illustrated in FIG. 10, an example is shown in which a list display area 51A is displayed in a frame separated from the entire image based on the image information 15A. Specifically, in the example illustrated in FIG. 10, the playback unit 12 displays, together with the entire image being displayed, a list from which a correspondence between the characteristic portions and the respective priority orders can be recognized. Note that, the display mode illustrated in FIG. 10 is only an example, and the playback unit 12 may display the list display area 51A in a screen different from that for the entire image.

When it is detected in Step S207 that any one of the operation keys associated with the priority orders is operated during the display of an image on the display 51 as described above (YES in Step S208), the playback unit 12 displays the characteristic portion corresponding to the detected key operation in an expanded manner (Step S209).

Figure 11:
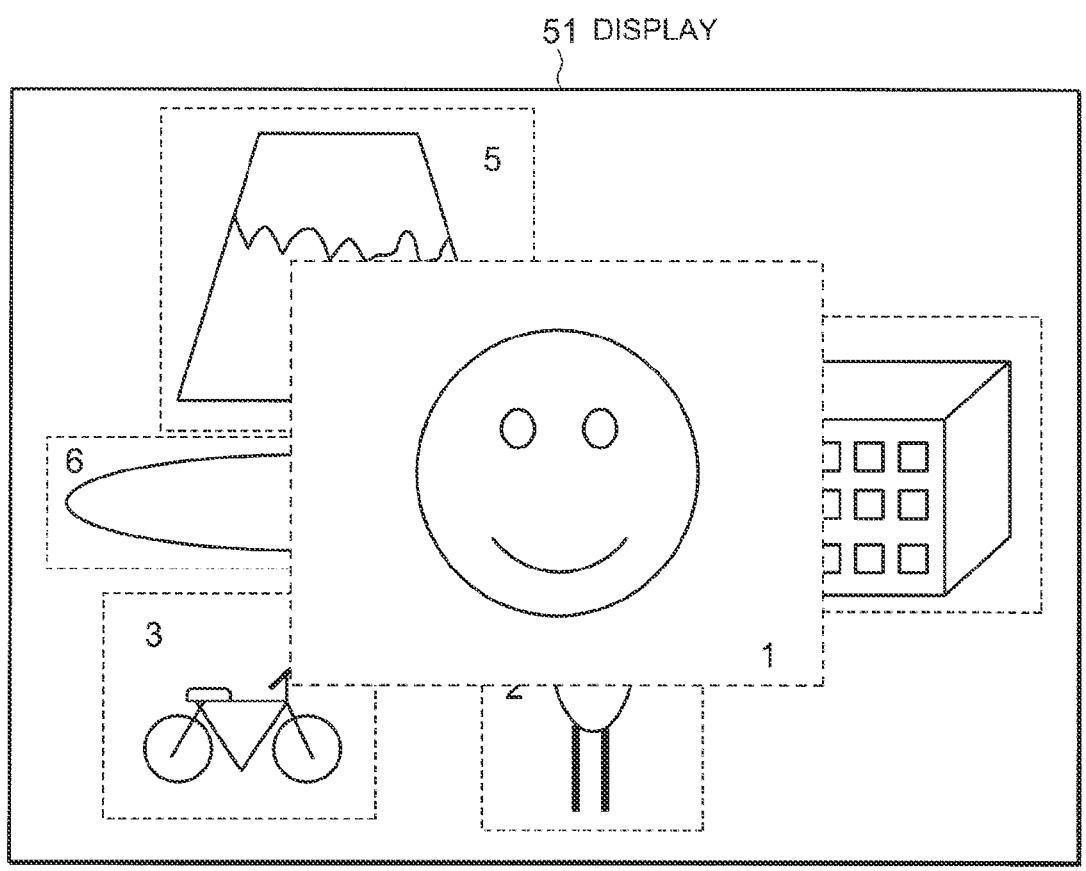
FIG. 11 is a diagram illustrating a display mode including an expanded image displayed by the playback unit 12 of the mobile terminal 50 in the execution of the contents playback processing in another embodiment.

FIG. 11 is a diagram illustrating a display mode including an expanded image displayed by the playback unit 12 of the mobile terminal 50 in the execution of the contents playback processing in the second embodiment of this embodiment. The example illustrated in FIG. 11 shows a state where, in the display mode illustrated in FIG. 9 or FIG. 10 previously described, the playback unit 12 displays a corresponding characteristic portion having the highest priority order in an expanded manner while superimposing the expanded characteristic portion on the entire image, in response to the operation of the numeric key 1 among the plurality of operation keys 52.

Note that the display mode of the expanded image in Step S209 is not limited to the display mode of FIG. 11, and the playback unit 12 may perform the display over the entire display region of the display 51.

The playback unit 12 determines whether or not an operation to terminate the expanded display is performed (Step S210). In the determination, if an operation of a predetermined operation key 52 different from the numeric keys described above in Step S201 is detected, for example (YES in Step S210), the playback unit 12 terminates the above-described series of processing, and also, displays only the entire image on the display 51, for example. On the other hand, if no operation of any key is detected over a predetermined period of time (NO in Step S210), the playback unit 12 returns the processing to Step S207.

Figure 12:
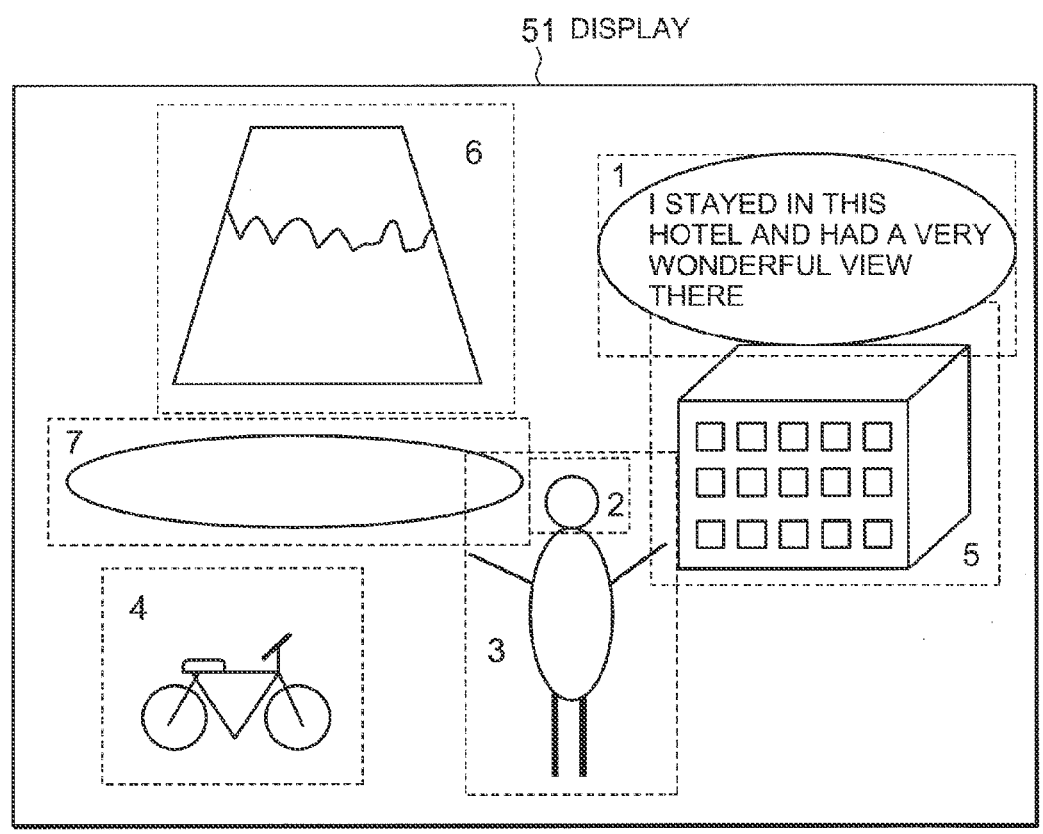
FIG. 12 is a diagram showing an example in which the playback unit 12 of the mobile terminal 50 displays information written (edited) for the contents sharing service in the execution of the contents playback processing in another embodiment.

As described above, the mobile terminal 50 according to this embodiment is applicable to the contents sharing service. FIG. 12 is a diagram showing an example in which the playback unit 12 of the mobile terminal 50 displays information written (edited) for the contents sharing service in the execution of the contents playback processing in the second embodiment of this embodiment. Specifically, the example illustrated in FIG. 12 shows a result of the priority-order determining unit 18 recognizing, as a characteristic portion having the highest priority order, the information ("I stayed in this hotel and had a very wonderful view there.") written for the contents sharing service. In addition, it is acknowledged from the example illustrated in FIG. 12 that the priority orders associated with the other characteristic portions are updated to 2 to 7 (the assignment of the operation keys is also updated to 2 to 7 in this embodiment).

In short, in this embodiment, each of the characteristic portions contained in the frame image is at least any one of a region corresponding to a result of image recognition (recognition of a face image, or the like) performed on the frame image and a result of editing an image region by the writing or the like of an arbitrary comment.

Figure 13:
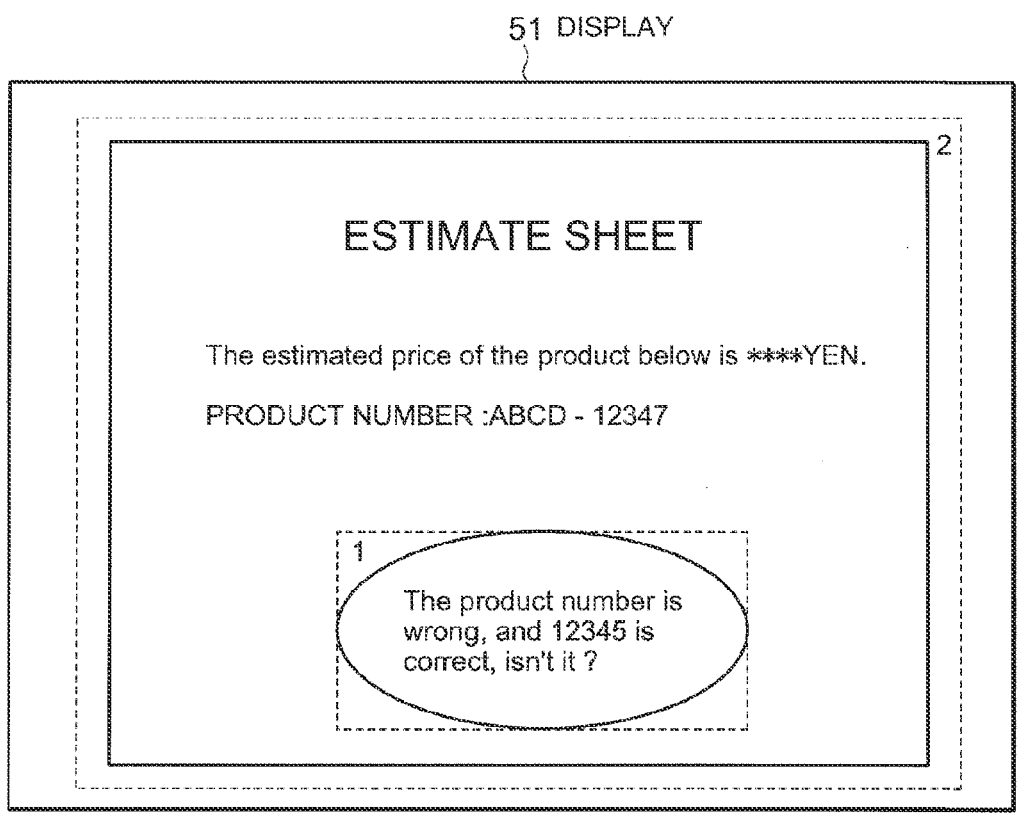
FIG. 13 is a diagram illustrating a display example of text information handled by the playback unit 12 of the mobile terminal 50 and information written for the contents sharing service in another embodiment.

It should be noted however that the contents which the mobile terminal 50 according to this embodiment is capable of playing back are not limited to image information. FIG. 13 is a diagram illustrating a display example of text information handled by the playback unit 12 of the mobile terminal 50 and information written for the contents sharing service in the second embodiment of this embodiment. Specifically, it is acknowledged from the example illustrated in FIG. 13 that text data (estimate sheet) played back as a display screen and information (a comment pointing out a clerical error) written for the contents sharing service are recognized as characteristic portions, and the highest priority order and the second priority order are given to the information and the text data, respectively (the assignment of operation keys is also 1 to 2 in the same manner in this embodiment).

Note that an arbitrary comment to be written as described above may be written in advance prior to the execution of the contents sharing service or may be written during the execution of the service. Moreover, an arbitrary comment to be written may be contained in advance in the image information (text data) 15A acquired from an external apparatus. Specifically, in the case of such arbitrary comment, a characteristic portion corresponding to the arbitrary comment represents a position where to display data written prior to execution, or during the execution, of the contents sharing with an external apparatus.

Figure 14:
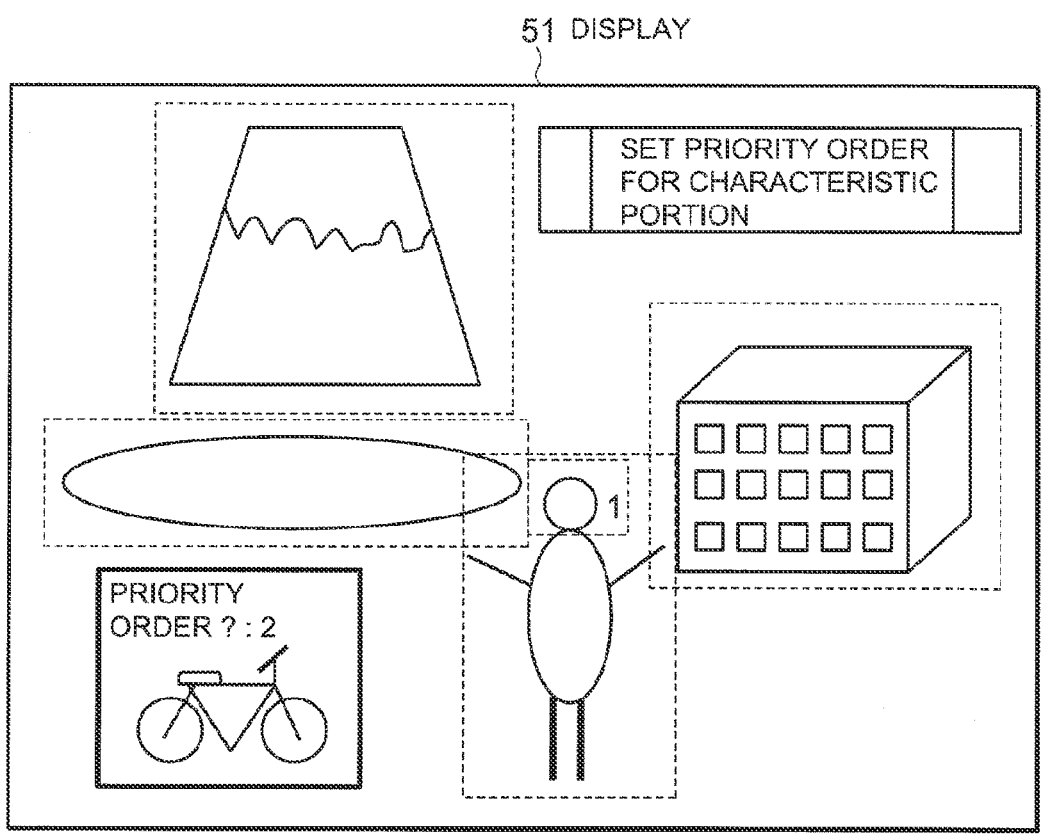
FIG. 14 is a diagram illustrating a user interface which the priority-order determining unit 18 provides for the setting of a priority order in another embodiment.

In addition, in this embodiment, the priority-order determining unit 18 may have a function of allowing a user to set a priority order for a characteristic portion desired to be set among the characteristic portions. FIG. 14 is a diagram illustrating a user interface which the priority-order determining unit 18 provides for the setting of a priority order in the second embodiment of this embodiment. Specifically, in the example illustrated in FIG. 14, the priority-order determining unit 18 of the mobile terminal 50 displays, on the display 51, a message encouraging the user of the own terminal to set a priority order. The example of FIG. 14 shows a state where, after the highest priority order is set for a face image among the characteristic portions indicated respectively by dashed line frames, an image of a bicycle indicated by a heavy line frame is selected by the user for setting the second priority order, and the number "2" representing the second priority order is set. In this user interface, the user has only to set a priority order for only a desired characteristic portion, and does not have to set the priority orders for all the characteristic portions.

The mobile terminal 50 according to this embodiment enables the user to promptly designate a desired portion when displaying a part of a content in an expanded manner, as in the case of the contents playback apparatus 1 according to the first embodiment, and is therefore capable of achieving an excellent operability. In addition, the mobile terminal 50 includes the priority-order determining unit 18, and thus, makes it possible to set the priority orders (priority-order information 17A) by using the own terminal. In other words, the mobile terminal 50 according to this embodiment makes it possible to set the priority orders according to the preference of the user of the own terminal. Then, the mobile terminal 50 makes it possible to smoothly perform the sharing of contents such as images with an external apparatus by providing, for example, priority-order information 17A to the external apparatus performing the contents sharing service, as described above.

Modification of the Second Embodiment

A modification described below is also achievable on the basis of the above-described second embodiment. Such modification also makes it possible to obtain the same effects as those of the first and second embodiments.

Specifically, in a first modification, a playback unit 12 erases the display of a characteristic portion displayed in an expanded display mode in response to the elapse of a predetermined period of time (termination of playback). Thereafter, in response to the operation of a specific operation key different from an operation key (numeric key 1 in the case of the example of FIG. 11) used for instructing the expansion, the playback unit 12 displays the latest characteristic portion displayed in the expanded display mode, again in the same display mode or in a further expanded display mode. Such first modification makes it possible to further improve the convenience of the mobile terminal 50.

In the second modification, a priority-order determining unit 18 changes the priority orders in accordance with an elapsed period of time after the appearance of a specific characteristic portion (for example, that of the highest priority order, a face image of a person, or the like) within a screen displayed on a display 51. According to such second modification, the priority orders are changed after the elapse of the predetermined period of time, for example, even when the priority orders automatically set by the own terminal or an external apparatus do not fit the preference of the user of the own terminal. Accordingly, the convenience of the mobile terminal 50 is further improved.

In a third modification, a priority-order determining unit 18 changes the priority orders in accordance with, an elapsed period of time after a screen displayed as illustrated in FIG. 9 to FIG. 11, is started to be displayed on a display 51. According to such third modification, the priority orders are changed after the elapse of the predetermined period of time, for example, even when the priority orders automatically set by the own terminal or an external apparatus do not fit the preference of the user of the own terminal.

Third Embodiment

Next, a third embodiment based on the mobile terminal 50 according to the above-described second embodiment will be described. In the following description, distinguishing portions according to this embodiment will be mainly described. At this time, the same configurations as those of the above-described first and second embodiments will be denoted by the same reference numerals, and redundant description will be omitted.

In the above-described second embodiment, the mobile terminal 50 is configured mainly for a static image displayed in accordance with the image information 15A as the content 15. By contrast, in this embodiment, a case will be described where a mobile terminal 50 plays back a moving image including a plurality of frame images as image information 15A.

Figure 15A:
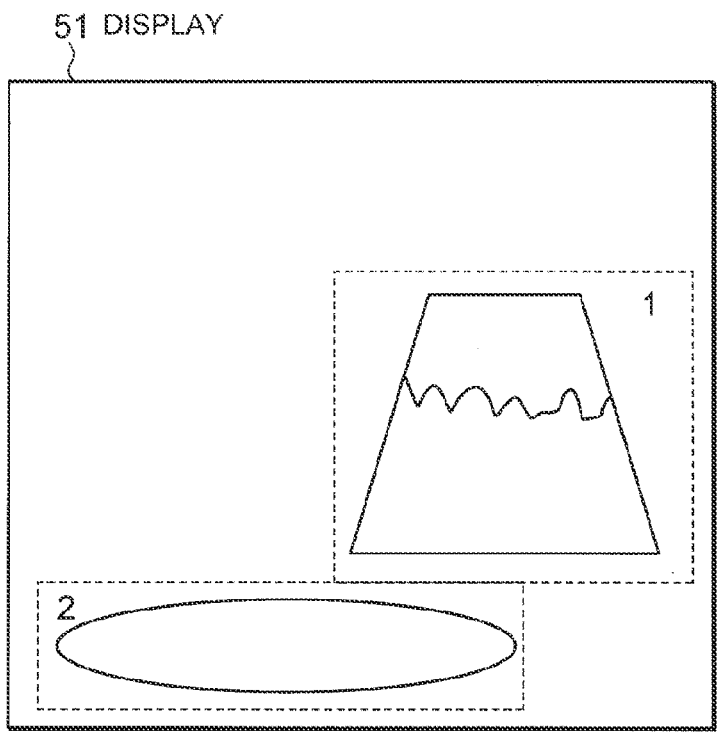
FIG. 15 is a diagram for describing a moving image which a playback unit 12 of a mobile terminal 50 displays in another embodiment.
Figure 15B:
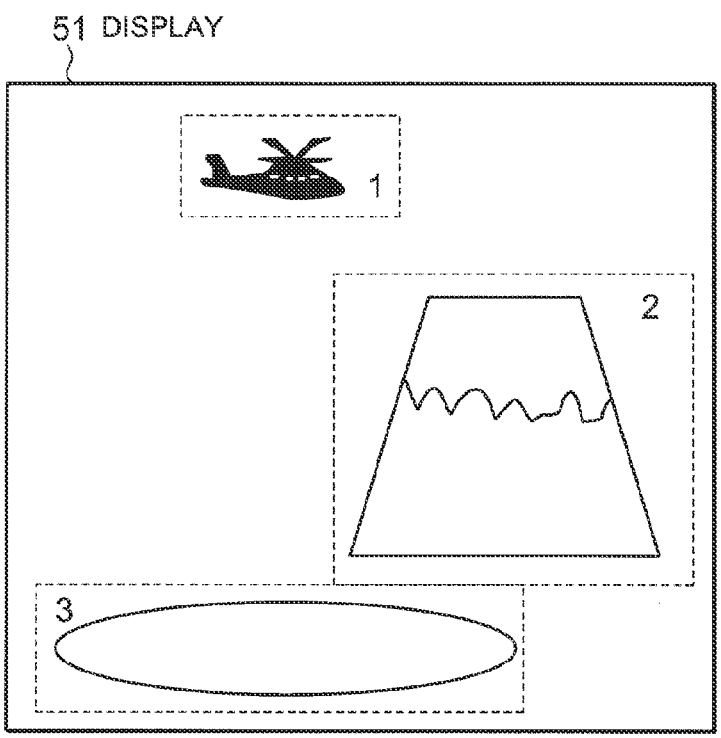
Figure 16:
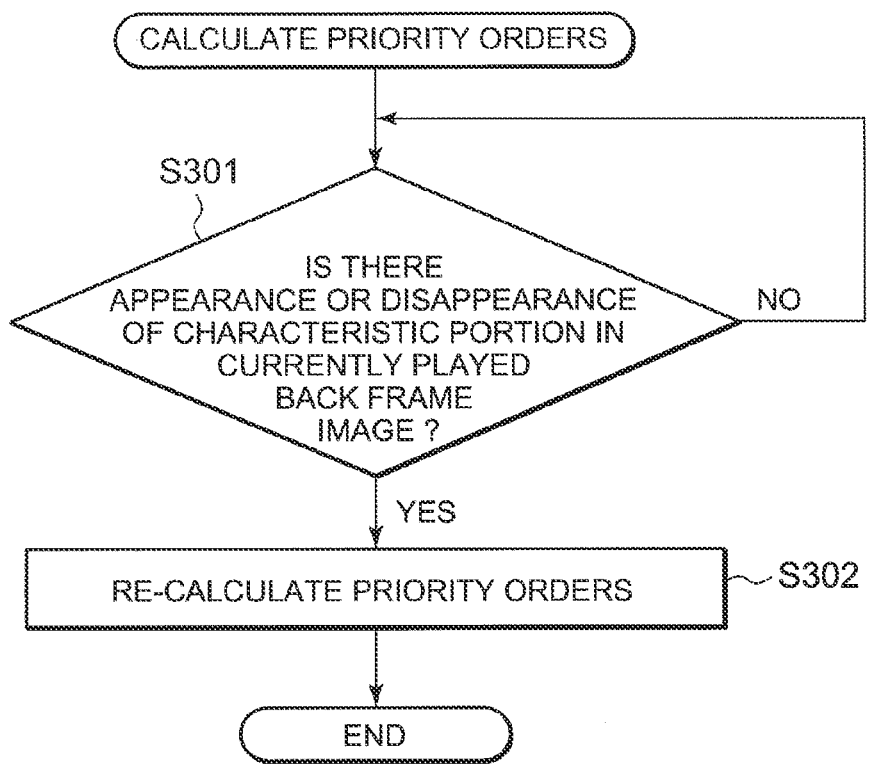
FIG. 16 is a flowchart showing procedures of determining priority orders performed by a priority-order determining unit 18 of the mobile terminal 50 in another embodiment.

FIG. 15 is a diagram for describing a moving image which a playback unit 12 of the mobile terminal 50 displays in the third embodiment of the present invention. FIG. 16 is a flowchart showing procedures of determining priority orders performed by a priority-order determining unit 18 of the mobile terminal 50 in the third embodiment of the present invention.

Specifically, in this embodiment, FIG. 15 shows a state where a helicopter as shown in Part (b) of FIG. 15 appears from the right toward the left in a scenery image shown in Part (a) of FIG. 15, and then, the helicopter passes over to disappear from the frame images, so that the scenery image shown in Part (a) of FIG. 15 is again displayed on the display 51. In such case, the priority-order determining unit 18 determines the presence or absence of an appearance of a new characteristic portion or a disappearance of an already recognized characteristic portion in frame images of a moving image being played back (Step S301). Then, when detecting an appearance or disappearance of a characteristic portion in the determination (YES in Step S301), the priority-order determining unit 18 re-calculates the priority orders of the respective characteristic portions contained in a frame image of interest. In this embodiment, for the detection of a moving object (the helicopter in the example of FIG. 15) in the frame images, an image processing technique that is currently generally available can be employed, and thus, detailed description will be omitted in this embodiment.

Specifically, in this embodiment, in response to the detection of a characteristic portion newly contained in a frame image currently displayed on the display 51 among the adjacent frame images played back on the basis of the image information 15A, the priority-order determining unit 18 resets the priority orders for a plurality of characteristic portions (three in the example of FIG. 15) including the new characteristic portion. In general, as the tendency of a human consciousness, the consciousness of a person tends to be directed to an object newly entering the field of view. For this reason, in this embodiment, the highest priority order is set for the characteristic portion that has newly appeared.

Then, in response to the detection that the characteristic portion contained in the frame image being displayed on the display 51 moves out of the frame image, the priority-order determining unit 18 resets the priority order while excluding the feature or characteristic portion that has moved out of the frame from the priority ordering (two in the example of FIG. 15).

The associating unit 11 calculates association information 14 on the basis of the new priority orders. Then, the playback unit 12 plays back the moving image together with information indicating at least any one of the priority orders and the operation key numbers by referring to the new association information 14.

Note that the processing of recalculating the priority orders performed by the priority-order determining unit 18 according to this embodiment is applicable not only to a moving image but also to various contents 15 such as a static image or text data described in the second embodiment. In this case, the priority-order determining unit 18 recalculates the priority order in response to the detection of an appearance or disappearance of a characteristic portion in a content of interest. Then, in this case, the associating unit 11 recalculates the association information 14 on the basis of the new priority orders.

In addition, each modification according to the above-described second embodiment is applicable also to the third embodiment.

The mobile terminal 50 according to this embodiment enables the user to promptly designate a desired portion when displaying a part of a content in an expanded manner as in the case of the first and second embodiments, and is therefore capable of achieving an excellent operability. Moreover, the mobile terminal 50 according to this embodiment includes the priority-order determining unit 18 that determines the priority orders for a moving image, and thus makes it possible to set the priority orders (priority-order information 17A) matching the tendency of the human consciousness. Further, as described above, the mobile terminal 50 makes it possible to smoothly perform contents sharing mainly handling moving images with an external apparatus by providing for example the priority-order information 17A to the external apparatus performing the contents sharing service.

The present invention described by giving the above-described first to third embodiments as examples is achieved by supplying a computer program that is capable of implementing the functions of the flowcharts (FIG. 2, FIG. 6, and FIG. 16), which are referred to in the description, to the contents playback apparatus 1 illustrated in FIG. 1, the mobile terminal 50 (FIG. 4) having the hardware configuration illustrated in FIG. 3, and then by executing the computer program by reading the computer program to the CPU (101). In addition, the computer program supplied into the contents playback apparatus 1 and the mobile terminal 50 may be stored in the readable and writable temporary storage memory (10) or a storage device (storage medium) such as an unillustrated hard disk apparatus or non-volatile memory.

Moreover, for a method of supplying a computer program into the apparatus, any procedures that are currently generally available may be employed, such as a method of installing the computer program into the apparatus via various storage media such as a memory card, a method of downloading from the outside via a communication network such as the Internet, and the like. Then, in such cases, the present invention is configured by the codes of the computer program or a storage medium in which the codes are stored.

INDUSTRIAL APPLICABILITY

Each of the above-described embodiments has been described by giving, as an example, the configuration in which the present invention is applied to the contents playback apparatus applied to a so-called contents sharing service. However, the present invention is not limited to this configuration, and is applicable to a case where a user solely uses the contents sharing service without sharing contents with the others.

What is claimed is:

1. A content playback apparatus comprising:
   operation keys;
   a playback unit configured to play back content which has a plurality of features; and
   a memory configured to store association information which associates each of the features individually with a predetermined key of the operation keys,
   wherein, in response to detecting operation of one of the operation keys during display of the content, the playback unit is further configured to play back the content with the feature corresponding to the detected operation key enlarged, in accordance with the association information, and
   wherein each of the plurality of features has a priority and the association information is generated by referring to the priority of the features relative to each other; and
   a priority-order calculating unit configured to calculate an order of the priorities for respective characteristic portions of the plurality of features contained in the content using at least one parameter and at least one equation,
   wherein the at least one parameter comprises at least one from among a result of writing by the contents sharing, a result of face recognition or person recognition, a feature designated during image processing or image editing, a focused feature, or a combination of these, and
   wherein the equation is a function of an elapsed period of time after the respective feature appears and a combination of the at least one parameter.

2. The content playback apparatus according to claim 1, wherein
   the playback unit is further configured to display, in a currently displayed content, the priority of the features in such a manner as to superimpose the priority on characteristic portions of the features in such a display mode that each of the priorities is recognizable.

3. The content playback apparatus according to claim 1, wherein
   the playback unit is further configured to display the priorities of the features, together with a currently displayed content or on a different screen from the currently displayed content, in such a display mode that a correspondence between the priorities and characteristic portions of the features is recognizable.

4. The content playback apparatus according to claim 1, wherein
in response to an operation of any of the operation keys during the display of the priorities over a predetermined period of time, the playback unit is further configured to play back the feature corresponding to the operated operation key in an expanded display mode.

5. The content playback apparatus according to claim 4, wherein
after erasing the playback of the expanded display mode in response to an elapse of the predetermined period of time, the playback unit is further configured to display the latest feature displayed in the expanded display mode, again in the same display mode or in a further expanded display mode, in response to an operation of a specific operation key different from the operation key.

6. The content playback apparatus according to claim 1, wherein
the content playback apparatus is an apparatus including a plurality of physical keys, and
the associating unit is further configured to associate the features respectively with at least numeric keys among the plurality of physical keys in accordance with the priority of the features.

7. The content playback apparatus according to claim 1, wherein
the content is a frame image, and
each of the features is information representing a focused position associated in advance with the frame image.

8. The content playback apparatus according to claim 1, wherein
each of the features is at least any of a characteristic point and a characteristic region contained in the content.

9. The content playback apparatus according to claim 1, wherein
the content is a frame image, and
each of the features is at least any of a region corresponding to a result of image recognition performed on the frame image and a result of editing an image region.

10. The content playback apparatus according to claim 1, wherein
each of the features is a position at which data written prior to execution, or during the execution, of contents sharing with an external apparatus is to be displayed.

11. The content playback apparatus according to claim 1, wherein
the content playback apparatus further comprises a priority-order setting unit configured to set an order of the priorities for the respective characteristic portions contained in the content.

12. The content playback apparatus according to claim 11, wherein
the content is a moving image formed of a plurality of frame images,
in response to detection of a feature newly contained in a currently displayed frame image among the adjacent frame images, the priority-order setting unit is further configured to reset the order of priorities for the plurality of features including the new feature, and
in response to detecting that a feature contained in a currently displayed frame image moves out of the frame image, the priority-order setting unit is further configured to reset the order of priorities excluding the feature that has moved out of the frame from the priority ordering.

13. The content playback apparatus according to claim 11, wherein
the priority-order setting unit is further configured to change the order of priorities in accordance with an elapsed period of time after a specific feature appears in a currently displayed content.

14. The content playback apparatus according to claim 11, wherein
the priority-order setting unit is further configured to change the order of priorities in accordance with an elapsed period of time after a currently displayed content is started to be displayed.

15. The content playback apparatus according to claim 11, wherein
the priority-order setting unit is further configured to determine the order of priorities on the basis of sizes of the respective features.

16. The content playback apparatus according to claim 11, wherein
the priority-order setting unit includes a user interface through which a user is allowed to set the order of priorities.

17. A content playback method comprising:
playing back content which has a plurality of features;
storing association information which associates each of the features individually with a predetermined key of operation keys,
wherein, during the playing back, in response to detecting operation of one of the operation keys during display of the content, the feature corresponding to the detected operation key is enlarged, in accordance with the association information, and
wherein each of the plurality of features has a priority and the association information is generated by referring to the priority of the features relative to each other; and
calculating an order of the priorities for respective characteristic portions of the plurality of features contained in the content using at least one parameter and at least one equation,
wherein the at least one parameter is comprises at least one among a result of writing by the contents sharing, a result of face recognition or person recognition, a feature designated during image processing or image editing, a focused feature, or a combination of these, and
wherein the equation is a function of an elapsed period of time after the respective feature appears and a combination of the at least one parameter.

18. A non-transitory computer readable storage medium storing a content playback program that when executed causes a computer to perform a method comprising:
playing back a content which has a plurality of features; and
storing association information which associates each of the features individually with a predetermined key among a plurality of operation keys,
wherein, during the playing back, in response to detecting operation of one of the operation keys, the feature corresponding to the detected operation key is enlarged, in accordance with the association information, and
wherein each of the plurality of features has a priority and the association information is generated by referring to the priority of the features relative to each other; and
calculating an order of the priorities for respective characteristic portions of the plurality of features contained in the content using at least one parameter and at least one equation, wherein the at least one parameter comprises at least one among a result of writing by the contents sharing, a result of face recognition or person recognition, a feature designated during image processing or image editing, a focused feature, or a combination of these, and
wherein the equation is a function of an elapsed period of time after the respective feature appears and a combination of the at least one parameter.

* * * * *